(12) United States Patent
Ono et al.

(10) Patent No.: US 6,879,768 B1
(45) Date of Patent: Apr. 12, 2005

(54) INFORMATION PROCESSING APPARATUS, METHOD THEREFOR AND MEMORY MEDIUM STORING INFORMATION PROCESSING PROGRAM

(75) Inventors: Kenichiro Ono, Yokohama (JP); Nobuhiro Hoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/516,115

(22) Filed: Mar. 1, 2000

(30) Foreign Application Priority Data

Mar. 5, 1999 (JP) .......................................... 11-057998
Mar. 9, 1999 (JP) .......................................... 11-061882

(51) Int. Cl.⁷ ................................................. H04N 5/91
(52) U.S. Cl. ......................... 386/46; 386/95; 386/124; 370/498; 370/528; 725/142
(58) Field of Search ............................... 386/124, 109, 386/95, 46, 83, 98, 102; 725/142, 141, 139, 151, 153; 370/498, 528; H04N 5/91

(56) References Cited

U.S. PATENT DOCUMENTS

| | | | | |
|---|---|---|---|---|
| 5,579,183 A | * | 11/1996 | Van Gestel et al. | ........... 360/48 |
| 5,648,960 A | * | 7/1997 | Sakazaki et al. | ............ 370/498 |
| 5,832,085 A | * | 11/1998 | Inoue et al. | ................ 386/124 |
| 5,909,257 A | * | 6/1999 | Ohishi et al. | ................. 725/54 |
| 6,169,843 B1 | * | 1/2001 | Lenihan et al. | ............. 370/394 |

* cited by examiner

*Primary Examiner*—Vincent Boccio
(74) *Attorney, Agent, or Firm*—Fitzpatrick, Cella, Harper & Scinto (57) ABSTRACT

There is provided information processing apparatus/method featured by selecting the desired packets from input stream data containing plural packets multiplexed on time-division basis, counting the number of packets other than the desired packets in the input stream data, and recording, on a recording medium, the data of the desired packets and the information data indicating the number of the counted packets.

10 Claims, 9 Drawing Sheets

INFORMATION PROCESSING APPARATUS, METHOD THEREFOR AND MEMORY MEDIUM STORING INFORMATION PROCESSING PROGRAM

BACKGROUND OF THE INVENTION

1. Field of the Invention

The present invention relates to information processing adapted for recording or reproducing a transport stream signal in which plural programs are multiplexed on time-division basis.

2. Related Background Art

For the broadcasting system of the next generation, the digital broadcasting employing MPEG (moving picture experts group) 2 system, in which plural programs are transmitted by multiplexing on time-division basis, is attracting attention.

In the following there will be explained the general time-division multiplexing system based on the MPEG2 system.

For example in the time-division system for video data, the DTS (decoding time stamp) for timing of fetching data from the decoder buffer at the decoder side and the PTS (presentation time stamp) for timing of displaying the data are inserted into the top of each picture. More specifically, each picture data of variable length is packetized into a packet called PES (packetized elementary stream), and PTS/DTS are inserted in the header of PES whereby the video/audio data can be synchronized.

The PTS/DTS are in practice composed of values of a counter functioning with the system clock signal (27 MHz) of the encoder. Consequently, there may be resulted in overflow/underflow of the buffer unless this system clock is reproduced also in the decoder side. Consequently, at the level of packetizing into 188 bytes, the counts of the system clock are periodically inserted as PCR (program clock reference). In the decoder, the PCR is detected and the system clock of the encoder is reproduced through a VCO (voltage-controlled oscillator) of 27 MHz and a PLL (phase locked loop). When plural programs are multiplexed, the PCR is inserted in the packet of each program.

Figure 1:
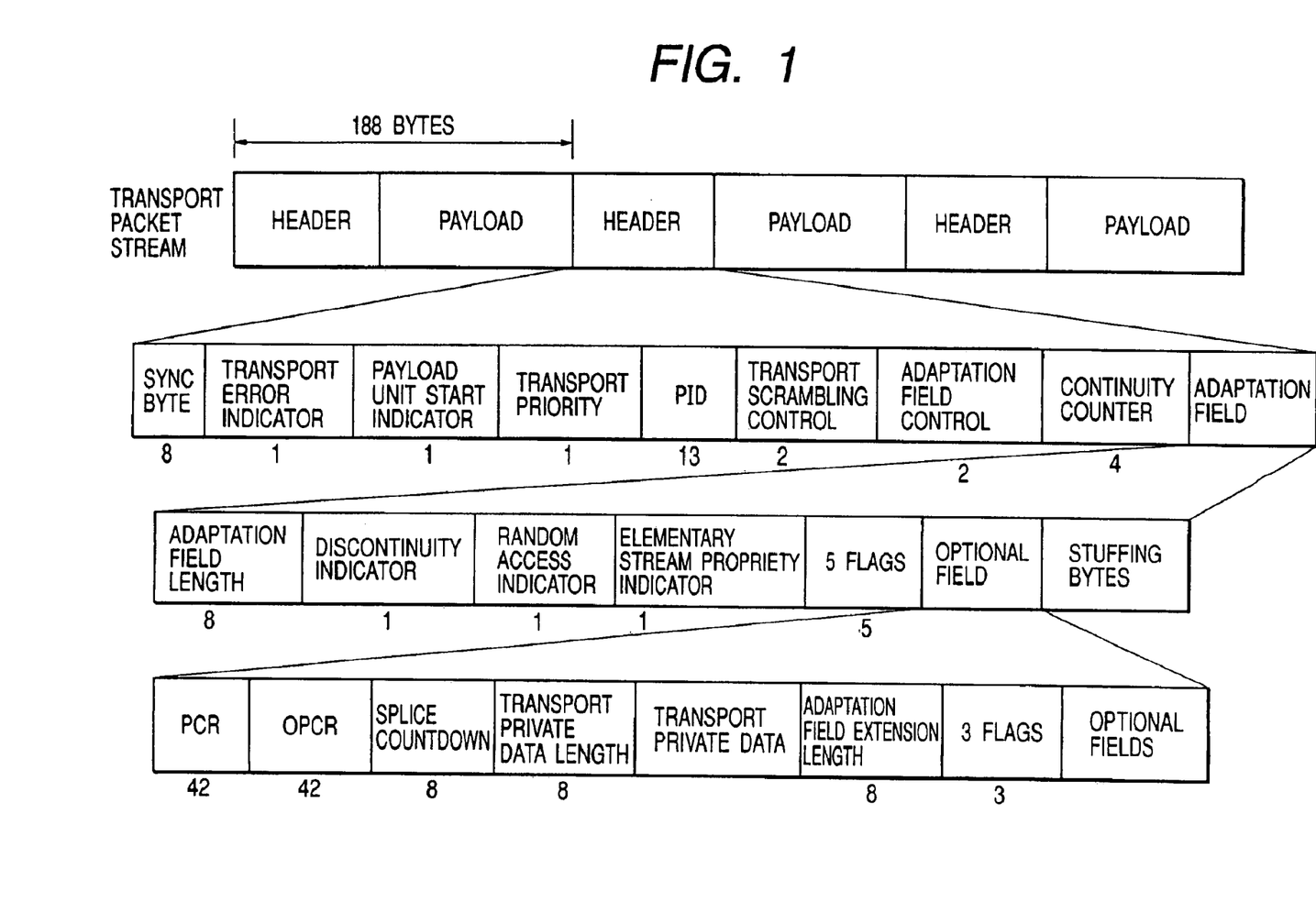
FIG. 1 is a view showing the configuration of a transport packet based on MPEG2.

FIG. 1 shows the configuration of a transport packet based on MPEG2.

The transport packet has a fixed length of 188 bytes. The header portion of the transport packet contains identification information indicating the content of the packet data, whereby a packet required for the reproduction of the desired program can be selected and decoded.

As shown in FIG. 1, the transport packet is provided, at the start of the packet, with a header, which is followed by payload (information).

The header is composed of sync data of 8 bytes, a transport error indicator indicating the presence or absence of error in the packet, a payload unit start indicator indicating the start of the payload unit, a transport priority indicating the importance of the packet, a packet identification (PID) indicating the attribute of individual stream of the packet, a transport scramble control indicating the presence or absence of scramble of the payload and the kind thereof, an adaptation field control indicating the presence or absence of adaptation field, a cyclic counter for detecting whether the packet has been partially discarded on the way, and an adaptation field that can contain additional information on the individual stream and stuffing bytes.

The adaptation field contains an adaptation field length indicating the length of the adaptation field, a discontinuity indicator indicating that the system clock is reset and renewed as a new content, a random access indicator indicating the entry point of random access, a priority stream elementary indicator indicating that an importance portion exists in the payload, and an optional field.

The optional field contains a PCR, an OPCR, a splice countdown, a transport private data length, transport private data, an adaptational field extension length, and an optional field. The PCR is a time stamp for setting and calibrating a time reference value in the MPEG system decoding. The system clock (27 MHz) is reproduced from the PCR by PLL, and the time axis information of the packet is retained as the reference of timing of the subsequent decoding process.

There are presently being developed recording/reproducing apparatus for recording and reproducing the above-described TS.

Among such apparatus, there is being developed a recording/reproducing apparatus having so-called delayed reproducing function, in which, while the digital broadcast program is recorded, the already recorded content is reproduced.

Such recording/reproducing apparatus is capable of recording a currently broadcast program and at the same time allows the user to reproduce and observe such program with a certain delay in time. For example, in case a live sport program is extended, the user can continue to observe the sport program, while recording for example a drama program, broadcast at the same time in another channel, on a recording medium, and can reproduce the recorded program from the beginning after the sport program is terminated, whereby the user can observe the currently broadcast program with the delay of an arbitrary time.

Also the recorded program can be given a special reproducing function such as slow reproduction or search reproduction, so that the currently broadcast program can be displayed as if the currently broadcast program could be reproduced with such special reproduction.

In the recording/reproducing apparatus capable of recording and reproducing by selecting a desired transport stream (TS) only from the TS containing plural programs by time-division multiplexing in order to attain the above-described functions, the data readout speed from the recording medium is controlled at the reproduction, after the demultiplexer, in order to maintain such a bit rate as not causing data underflow or overflow.

As a method of such recording and reproduction, in order to match the decoding rate with the rate of the reproduced bit stream, there is known a method of adding a time stamp on each transport stream at the recording operation and, at the reproduction, controlling the readout of the bit stream so as to match such time stamp.

However, such method has been associated with a drawback of an increased load for controlling the data readout rate in order to maintain the bit rate. Also there may be recorded all the entered TS to avoid the increase of load, but the recording capacity becomes unnecessarily large in order to record the programs other than the desired one.

Further, there is resulted in a drawback that the amount of recorded information becomes large in case the time stamp is attached to every recorded transport stream.

SUMMARY OF THE INVENTION

In consideration of the foregoing, an object of the present invention is to provide an information processing apparatus and a method therefor, capable of maintaining a constant reproducing bit rate without special control in reading the data from the recording medium, and achieving recording and reproduction with a minimum recording capacity, dispensing with the recording of TS other than the desired one. The above-mentioned object can be attained, according to a preferred embodiment of the present invention, by an information processing apparatus/method which comprises steps of/means for selecting a desired packet from input stream data containing plural packets by time-division multiplexing, counting the number of packets other than the desired packets in the input stream data, and recording data of the desired packet and information data indicating the number of the counted packets.

Also in another preferred embodiment, there is provided an information processing apparatus/method for reproducing data from a recording medium in which data of a desired packet extracted from a first stream data containing plural packets which are time-division multiplexed and information data indicating the number of the packets, other than the desired packets, present in such stream data are recorded, the apparatus/method comprising steps of/means for reproducing the data of the desired packet and the information data from the aforementioned recording medium, and inserting null packets of a number same as that of the packets indicated by the reproduced information data into among the desired packets thereby generating a second stream data.

Another object of the present invention is to provide an information processing apparatus/method capable of matching the rate of decoding process and the reading rate of the recording/reproducing unit without increasing the information amount at the recording, thereby avoiding the data underflow or overflow at the decoding operation.

The above-mentioned object can be attained, according to a preferred embodiment of the present invention, by an information processing apparatus/method which comprises steps of/means for determining the transfer rate from time information inserted in a stream signal, recording the stream signal on a recording medium and reproducing it at a predetermined rate, storing the reproduced stream signal on a memory medium, determining the time information corresponding to the above-mentioned predetermined rate based on the time information of the reproduced stream signal and the transfer rate, comparing the time information of the reproduced stream signal with the time information corresponding to the predetermined rate, and controlling the readout from the memory medium according the result of the comparison.

Other objects, features and advantages of the invention will become apparent from the following detailed description taken in conjunction with the accompanying drawings.

DETAILED DESCRIPTION OF THE PREFERRED EMBODIMENTS

In the following there will be explained a first embodiment of the present invention, with reference to the accompanying drawings.

Figure 2:
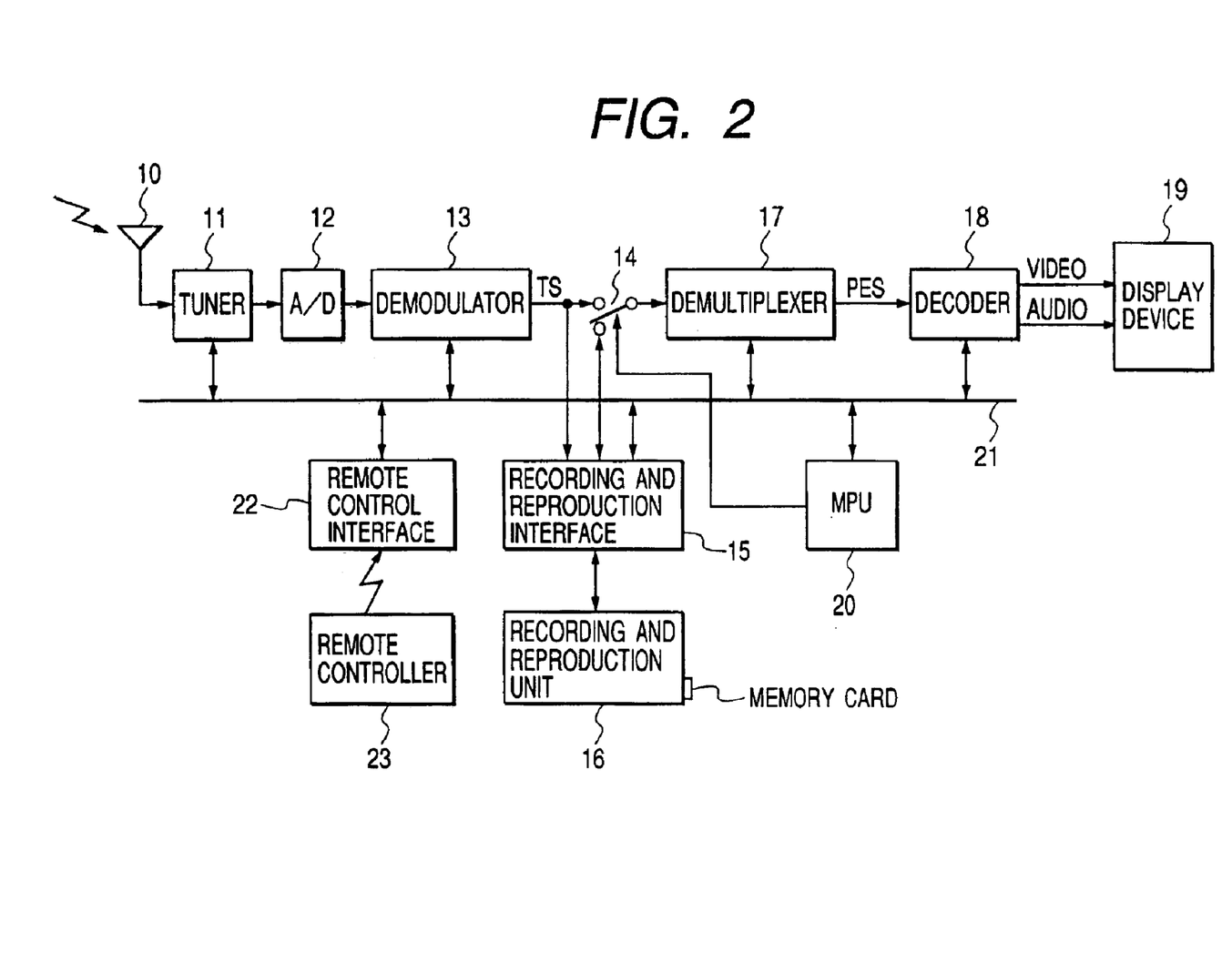
FIG. 2 is a block diagram showing the configuration of an information processing apparatus constituting a first embodiment of the present invention.

FIG. 2 is a block diagram showing the configuration of an information processing apparatus constituting a first embodiment of the present invention. This information processing apparatus contains a reception apparatus of set-top box type for receiving the digital broadcasting with a stream signal based on the MPEG2 system of ISO/IEC 13816-1.

Referring to FIG. 2, there are shown an antenna 10 for receiving the broadcast wave; a tuner 11 for selecting a transmission transponder frequency thereby converting the received high frequency wave into an intermediate frequency and effecting detection; an A/D converter 12 for converting the analog output of the tuner 11 into a digital signal; a demodulator 13 for effecting demodulation, error correction and decoding of the input signal; a recording/reproduction interface 15 for receiving the transport stream (TS) data from the demodulator 13, writing the data in a recording medium of a recording/reproduction unit 16 with data conversion, and outputting the read data to a demultiplexer 17; and a recording/reproduction unit 16 having an input/output buffer and capable of recording and reproduction at the same time. The recording/reproduction unit 16 is provided, as the data recording medium, with a fixed hard disk or a RAM, and can also utilize a detachable hard disk or a memory card. Thus the user can record the data by selecting a desired recording medium.

There are also shown a switch 14 switched by an MPU 20, for switching the TS data input of the demultiplexer 17; a demultiplexer 17 for converting the TS data into PES (packetized elementary stream); a decoder 18 for decoding the PES data, which are MPEG data, into a video signal and an audio signal; and a display device 19 for outputting, for audiovisual observation, the video signal and the audio signal from the decoder 18.

There are further shown an MPU 20 for controlling various modules; a common bus 21 connecting the various modules with the MPU 20; a remote controller 23 for allowing the user to designate channel selection, recording etc.; a remote control interface 22 for transmitting the instruction from the remote controller 23 through the bus 21; and a display device 24 for outputting, for audio/visual observation, the video signal and the audio signal from the decoder 18.

In case the broadcast signal is subjected to audio/visual observation without recording, the MPU 20 shifts the switch 14 to the output of the demodulator 13.

Now there will be explained the operation of TS recording, with reference to FIGS. 3, 4 and 5.

Figure 3:
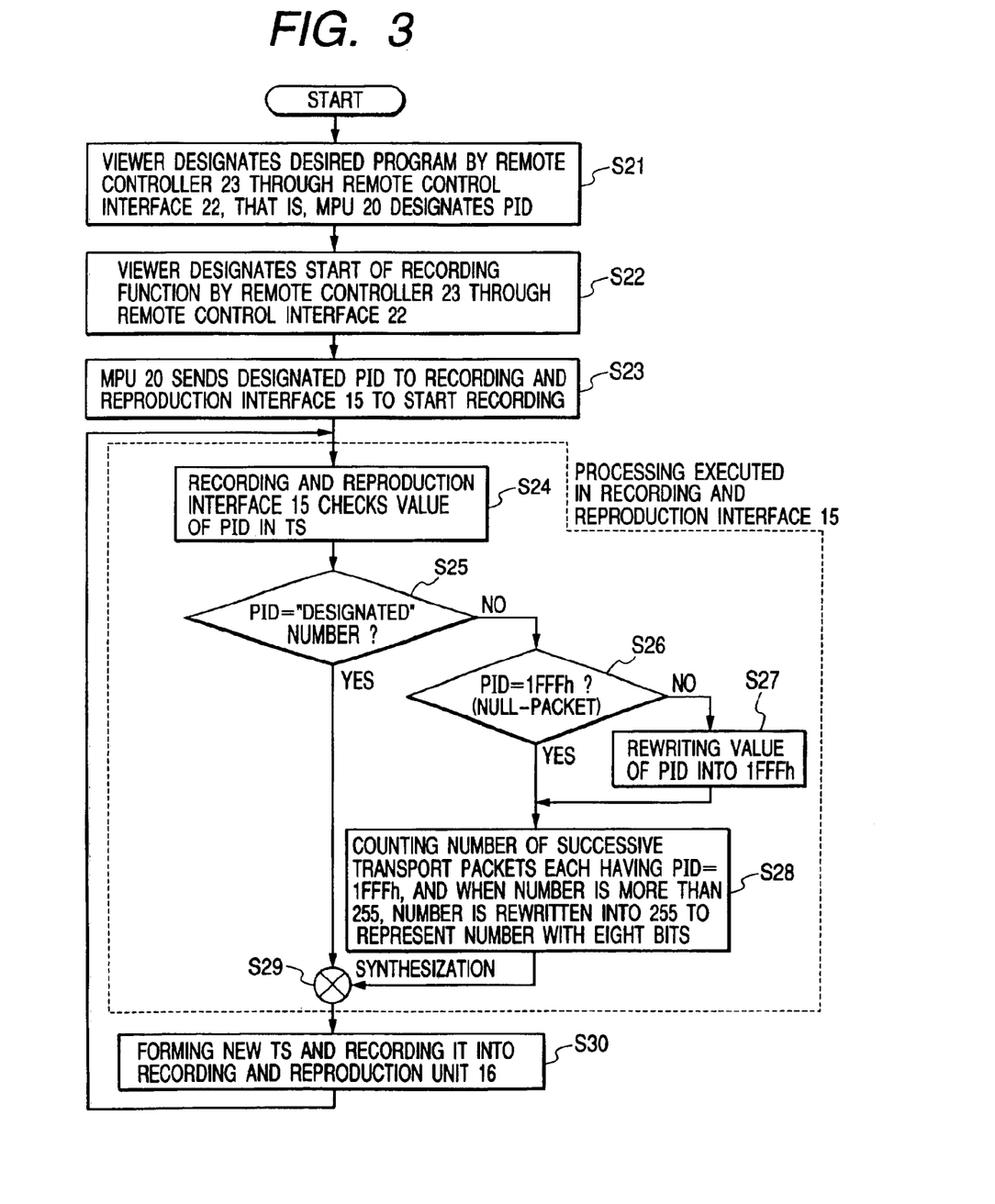
FIG. 3 is a flow chart showing the function of the first embodiment at the information recording.
Figure 4:
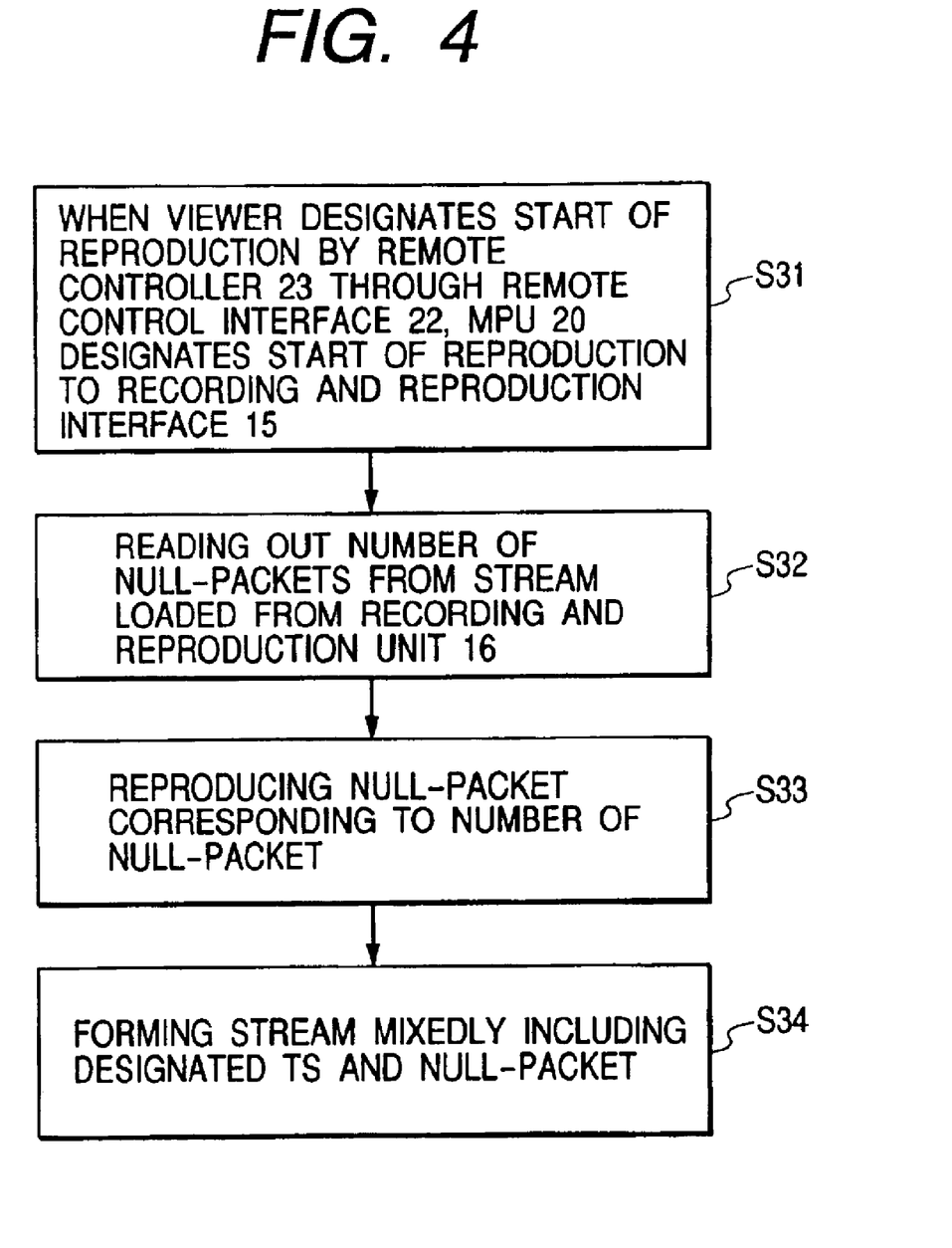
FIG. 4 is a flow chart showing the function of the first embodiment at the information reproduction.

Referring to FIG. 2, when the user selects a desired program by the remote controller 23, a PID corresponding in 1-to-1 relationship to the channel of such program is designated by the MPU 2 through the remote control interface 22 (S21 in FIG. 3).

Then the user designates start of image recording with the remote controller 23, the start of the recording function is transmitted through the remote control interface 22 (S22). The MPU 20 transmits the designated PID to the recording/reproduction interface 15 through the common bus 21, thereby starting the recording operation (S23).

Figure 5:
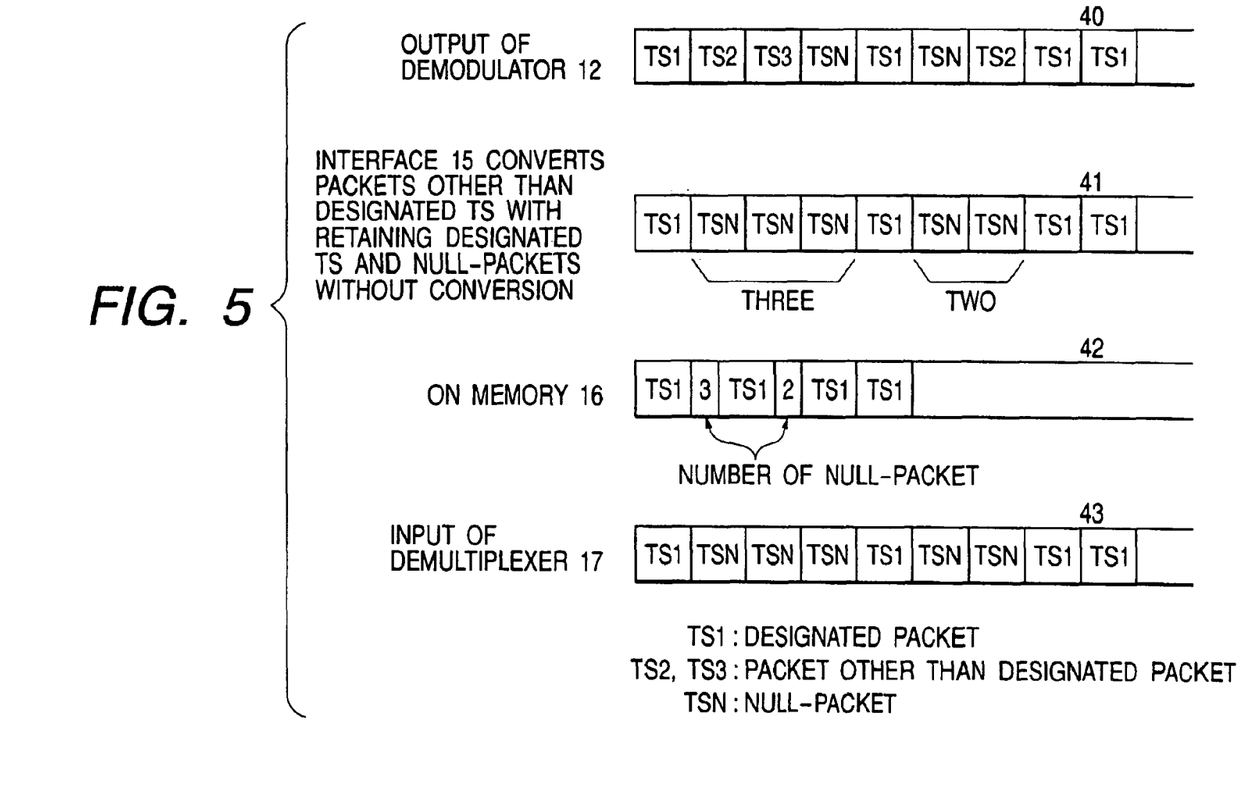
FIG. 5 is a view showing the conversion of stream in the first embodiment.

As shown in FIG. 5, in the TS 40 from the demodulator 13 packets TS1, TS2 . . . TSN for respective programs are multiplexed, so that plural packets are present in mixed manner therein.

The recording/reproduction interface 15 checks the value of the PID of 13 bits inserted in the TS (S24), and, if the PID value coincides with the value designated by the MPU 20, leaves such packet unchanged (S25). Also if the PID is 1FFFh for a null packet, the packet remains unchanged (S26). It is noted that MPEG-TS null packet, having a PID defined as 1FFFh, is a grammatically correct signal, and is merely disregarded by the decoder, thus not inducing an error.

If the PID value is otherwise, the PID is rewritten into null data 1FFFh, whereby the packet is converted into a null packet (S27). In the stream 40 shown in FIG. 4, if TS1 is the designated packet while TSN is a null packet, the non-designated packets TS2, TS3 are converted into null packets TSN, whereby the stream contains the designated packets and the null packets only as shown by 41 in FIG. 5.

Then the number of consecutive null packets is counted and is represented by an 8-bit value (S28). If the number exceeds 255, the number is set as 255. In case of the stream 41 shown in FIG. 5, there is obtained a number 3 because three null packets TSN are present between the initial designated packet TS1 and the next packet TS1.

Then the null packet TSN and the designated packet TS1 are synthesized (S29), whereby conversion is made: to a stream indicating the number of the designated packets and the null packets, as indicated by 42 in FIG. 5. Such stream 42 is recorded on the recording medium in the recording/reproduction unit 16 (S30). In this operation, if the designated packets TS1 are present in consecutive manner, there is not inserted the stream indicating the number of the null packets.

The foregoing steps S24 to S30 are repeated while the recording is instructed.

The recording medium employed in the recording/reproduction unit 16 can be a semiconductor memory, a magnetic medium such as a hard disk or a magnetic tape, a magnetooptical recording medium such as an MO or a PD, or an optical memory medium such as a DVD-RAM.

In the following explained is the reproducing operation, with reference to FIGS. 4 and 5.

When the user designates start of reproduction by the remote controller 23, the start of the reproducing function is transmitted through the remote control interface 22. The MPU 20 designates reproduction to the recording/reproduction interface 15 and shifts the switch 14 to the side of the recording/reproduction interface 15.

As the stream reproduced in the recording/reproduction unit 16 is in a format 42 in FIG. 5, the recording/reproduction interface 15 detects the number of null packets from the stream 42 (S32). The designated TS is provided, at the head thereof, with a sync byte of 8 bits having a specific value, and by reading such sync byte, it is possible to distinguish the stream indicating the number of the null packets.

Then the null packets (PID=1FFFh) are reproduced (prepared) by the above-mentioned number of the null packets (S33).

Then there is prepared a stream in which the designated TS and the null packets are mixedly present (S34). This stream has a format 43 shown in FIG. 5, in which the designated packets and the null packets are mixed. The stream 43 is supplied to the demultiplexer 17 and reproduced therein.

The recording/reproduction unit 16, being capable of recording and reproduction at the same time, simultaneously executes the recording and the reproduction explained in the foregoing, thereby realizing the delayed reproducing operation in which the broadcast wave is recorded and the TS is reproduced immediately after recording.

In the following there will be explained the memory medium employed in the present invention.

The above-described embodiment shown in FIG. 2 may be constituted by a hardware circuit but may also be constituted by a computer system including a CPU and a memory. In case it is constituted by the computer system, the above-mentioned memory constitutes the memory medium in the present invention. Such memory medium stores a program for executing the operations explained in the foregoing embodiment, including the operations shown in the flow chart shown in FIG. 3.

Such memory medium can be composed of a semiconductor memory such as ROM or RAM, an optical disk, a magnetooptical disk or a magnetic memory medium, which may be constructed in a CD-ROM, an FD, a magnetic card, a magnetic tape or a non-volatile memory card.

Consequently, also in case such memory medium is utilized in a system or an apparatus other than the system shown in FIG. 2 and such system or apparatus reads and executes the program codes stored in the memory medium, functions and effects equivalent to those in the foregoing embodiment can be realized and the objects of the present invention can be attained.

Also in case an operating system or the like functioning on a computer executes all the process or a part thereof, or in case the program codes read out from the memory medium are once stored in a memory provided in a function expansion board inserted into the computer or a function expansion unit connected to the computer, and a CPU provided in the function expansion board or the function expansion unit executes all the process or a part thereof according to the instructions of such program codes, the functions and effects equivalent to those in the foregoing embodiment can be realized and the objects of the present invention can be attained.

According to the foregoing first embodiment, as explained in the foregoing, the desired packets are selected from the input stream signal, then all other packets are converted into null packets, and such desired packets and the number of the null packets alone are recorded and reproduced, whereby the bit rate can be maintained constant without a large load on the control in the reproducing operation and the recording and reproduction can be realized with the minimum recording capacity for the packets other than the desired ones.

Figure 6:
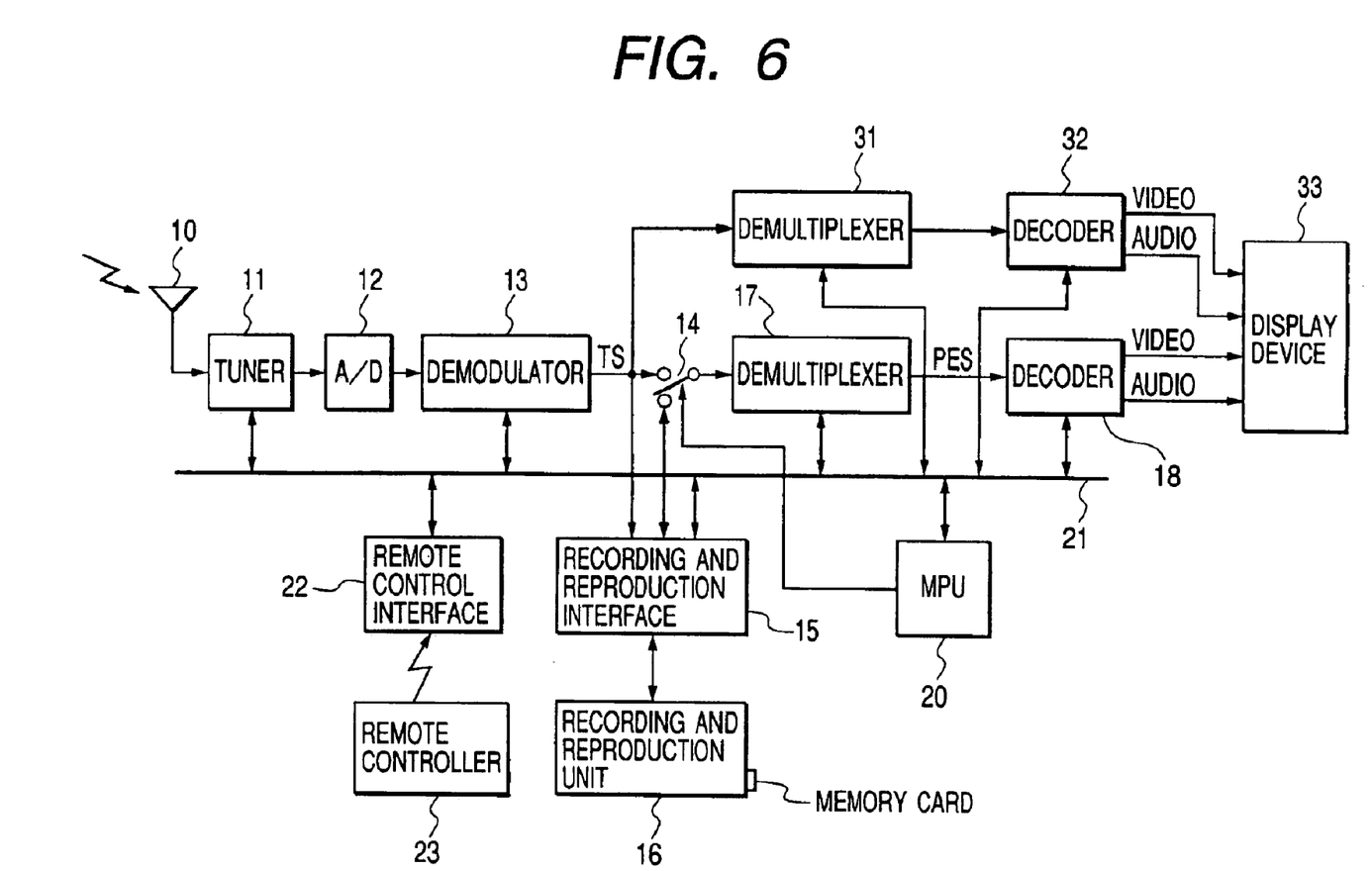
FIG. 6 is a block diagram showing the configuration of an information processing apparatus constituting a second embodiment of the present invention.

FIG. 6 is a block diagram showing the configuration of an information processing apparatus constituting a second embodiment of the present invention, wherein components equivalent in function to those in FIG. 2 are given corresponding numbers and will not be explained further.

In FIG. 6, there are shown a demultiplexer 31 for converting the TS data into PES data as in the demultiplexer 17;

a decoder 32 for decoding the PES data, which are MPEG data, into a video signal and an audio signal as in the decoder 18; and a display device 33 for selectively outputting the video signal and the audio signal from the decoders 32 and 18.

The display device 33 selectively outputs at least the audio signal, and can also display the video signal either selectively or in multi-window display of two program, according to the selection of the user.

Thus the second embodiment enables simultaneous display of simultaneously desired two programs, from the TS in which plural programs are multiplexed. Such simultaneous display is not limited to two programs as explained in the foregoing, but there can naturally be displayed plural programs by providing the demultiplexer 31 and the decoder 32 in plural units.

Figure 7:
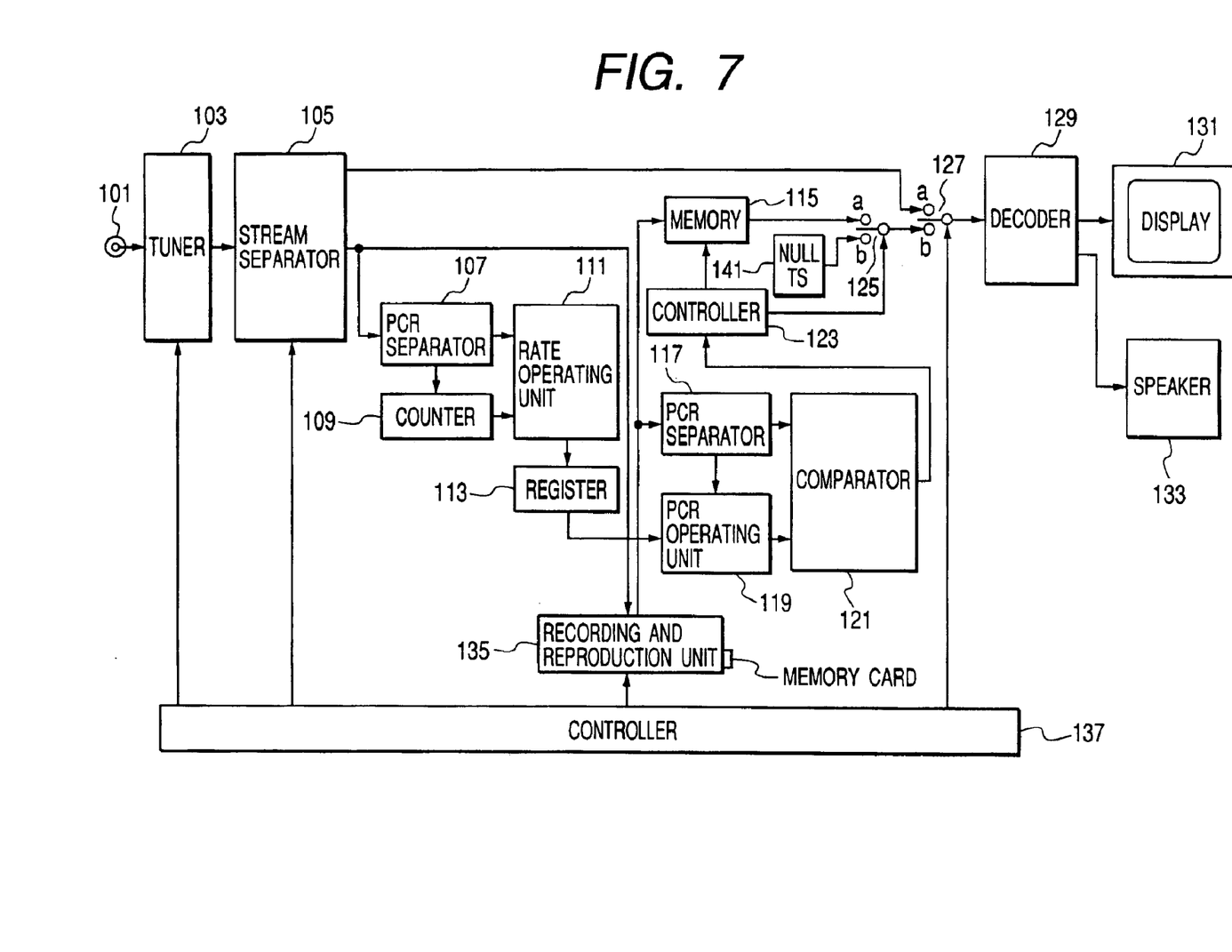
FIG. 7 is a block diagram showing the configuration of an information processing apparatus constituting a third embodiment of the present invention.

FIG. 7 is a block diagram showing the configuration of an information processing apparatus constituting a third embodiment of the present invention.

Referring to FIG. 7, the broadcast signal entered from an input terminal 101 is converted, by a tuner 103, into a transport stream signal in which plural digitized program signals are multiplexed on time-division basis, to supply the transport stream signal to a stream separator 105. In the stream separator 105, according to the control signal from a controller 137, the transport stream signal of a program to be currently observed is supplied to a terminal a of a switch 127 while the transport stream signal of a program to be recorded is supplied to a recording/reproduction unit 135 and a PCR separator 107. The recording/reproduction unit 135 is provided, as the data recording medium, with a fixed hard disk or a RAM, and can also utilize a detachable hard disk or a memory card. Thus the user can record the data by selecting a desired recording medium.

The PCR separator 107 separates PCR, inserted as time information in the transport stream, to supply the separated PCR to a rate operator 111, and resets the number in a counter 109. The counter 109 counts the number of bytes in the transport stream existing between PCR and next PCR, to supply the count to the rate operator 111. The rate operator 111 calculates the byte rate of the separated transport stream, from the value of PCR and the value of the counter 109.

The transport rate is defined by the number of bytes present between the bytes respectively including the last bits of two consecutive PCR fields of a same program in the transport stream, divided by the difference in the times when these two same PCR fields are encoded respectively, and its calculation is defined by the following equation (1) according to the ITU-TH222 standard:

$$\text{Transport\_rate} = [(I'-I'') \times \text{system clock frequency}]/[PCR(I') - PCR(I'')] \quad (1)$$

wherein I' is the index number of a byte including the last bit of the base field of the latest PCR applicable to the program to be decoded, and I" is the index number of a byte including the last bit of the base field of an immediately succeeding PCR applicable to the program to be decoded, in which I" is smaller than I'.

Thus the byte rate is obtained by the number of bytes present between PCR's, multiplied by the system clock frequency and divided by the difference in the value of PCR and that of next PCR. The transfer rate of the transport stream, thus determined by the rate operator 111, is recorded in a register 113, which outputs the rate to the controller 137 and a PCR operator 119. The register 113 is provided with plural registers respectively corresponding to the programs.

On the other hand, in the reproducing side, the recorded transport stream is read out from the recording/reproduction unit 135 at a byte rate designated by the control signal from the controller 137, and is supplied to the PCR separator 117 and a memory 115. The PCR separator 117 separates PCR from the reproduced transport stream, and outputs the latest PCR to a comparator 121 and outputs an immediately preceding PCR to the PCR operator 119.

The PCR operator 119 calculates the current PCR value from the transfer rate of the transport stream from the register 113 and the immediately preceding PCR value from the PCR separator 117, and outputs the current PCR value to the comparator 121. The calculation formula of the PCR operator 119 is represented by (2), which is a modification of (1):

$$PCR(I') = PCR(I'') + [(I'-I'') \times \text{system clock frequency}]/\text{transport\_rate} \quad (2)$$

The comparator 121 compares the PCR value separated from the transport stream and the PCR value determined from the PCR operator 119, and sends the result of comparison to a controller 123. If the calculated PCR value is smaller than the PCR value separated from the transport stream, the controller 123 terminates the memory readout and shifts the switch 125 to the terminal b, thereby inserting a null transport stream immediately in front of the transport stream containing PCR.

If the calculated PCR value is equal to the PCR value separated from the transport stream, the memory 115 is so controlled as to read the transport stream and the switch 125 is connected to the terminal a to select the recorded transport stream. The null transport stream mentioned above is defined by the ITU-TH222 standard.

Figure 8:
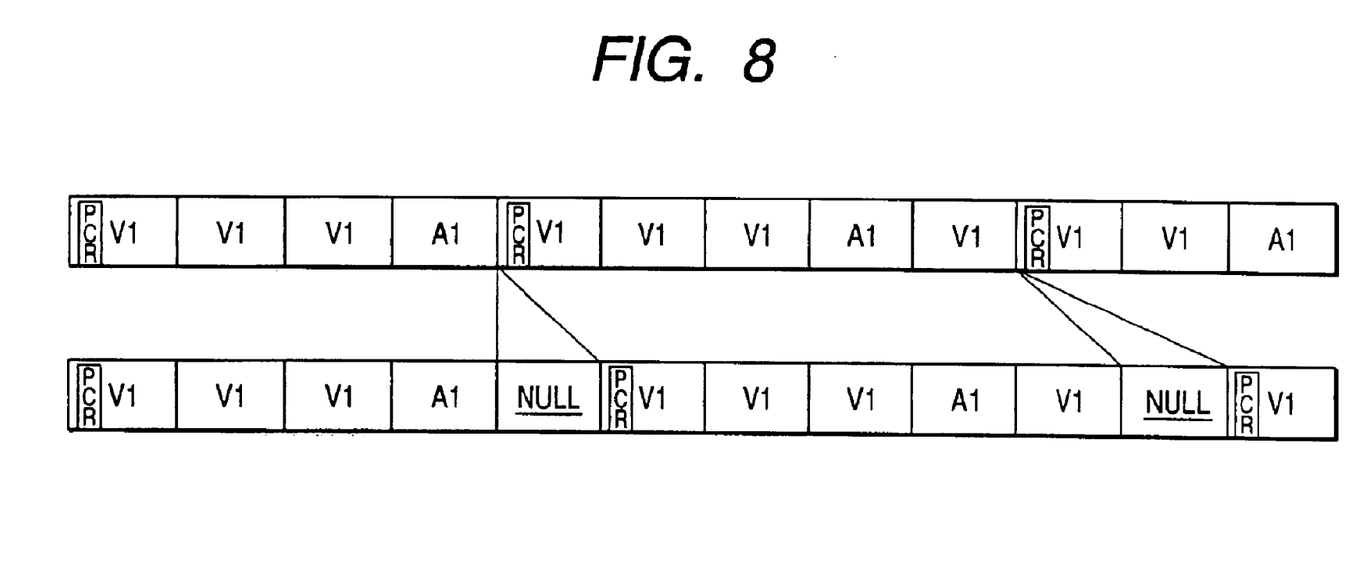
FIG. 8 is a view showing the conversion of stream in the third embodiment.

FIG. 8 shows the mode of insertion of the null transport stream in front of the PCR, wherein the upper row indicates the mode of the transport stream read from the recording/reproduction unit 135, while the lower row indicates a state in which a predetermined byte rate is obtained by inserting the null transport, stream in front of PCR for rate adjustment.

The transport stream adjusted to the predetermined byte rate by the insertion of the null transport stream in the transport stream in front of PCR is subjected in a decoder 129 to the decoding of the video signal and the audio signal, and the video signal is supplied to a display unit 131 while the audio signal is supplied to a speaker 133.

The controller 137 may be realized by a microcomputer or the like, and may incorporate the bit rate operator 111, register 113 and PCR operator 119.

In the following there will be given an explanation on the memory medium, as other embodiments of the present invention.

The above-described embodiment shown in FIG. 7 may be constituted by a hardware circuit but may also be constituted by a computer system including a CPU and a memory. In case it is constituted by the computer system, the above-mentioned memory constitutes the memory medium in the present invention. Such memory medium stores a program for executing the operations explained in the foregoing embodiment.

Such memory medium can be composed of a semiconductor memory such as ROM or RAM, an optical disk., a magnetooptical disk or a magnetic memory medium, which may be constructed in a CD-ROM, an FD, a magnetic card, a magnetic tape or a non-volatile memory card.

Consequently, also in case such memory medium is utilized in a system or an apparatus other than the system shown in FIG. 7 and such system or apparatus reads and executes the program codes stored in the memory medium, functions and effects equivalent to those in the foregoing embodiment can be realized and the objects of the present invention can be attained.

Also in case an operating system or the like functioning on a computer executes all the process or a part thereof, or in case the program codes read from the memory medium are once stored in a memory provided in a function expansion board inserted into the computer or a function expansion unit connected to the computer, and a CPU provided in the function expansion board or the function expansion unit executes all the process or a part thereof according to the instructions of such program codes, the functions and effects equivalent to those in the foregoing embodiment can be realized and the objects of the present invention can be attained.

As explained in the foregoing, the present embodiment determines the transfer rate of a program to be recorded, also in the reproducing operation, determines the time information such as PCR value corresponding to the reproduction rate, compares such time information with the time information in the reproduced stream signal, and controls the readout operation of the memory means according to the result of comparison, thereby achieving recording and reproduction of the desired program only, with the process rate at the decoding matched with the readout rate at the reproduction and without recording the unnecessary time stamps.

Figure 9:
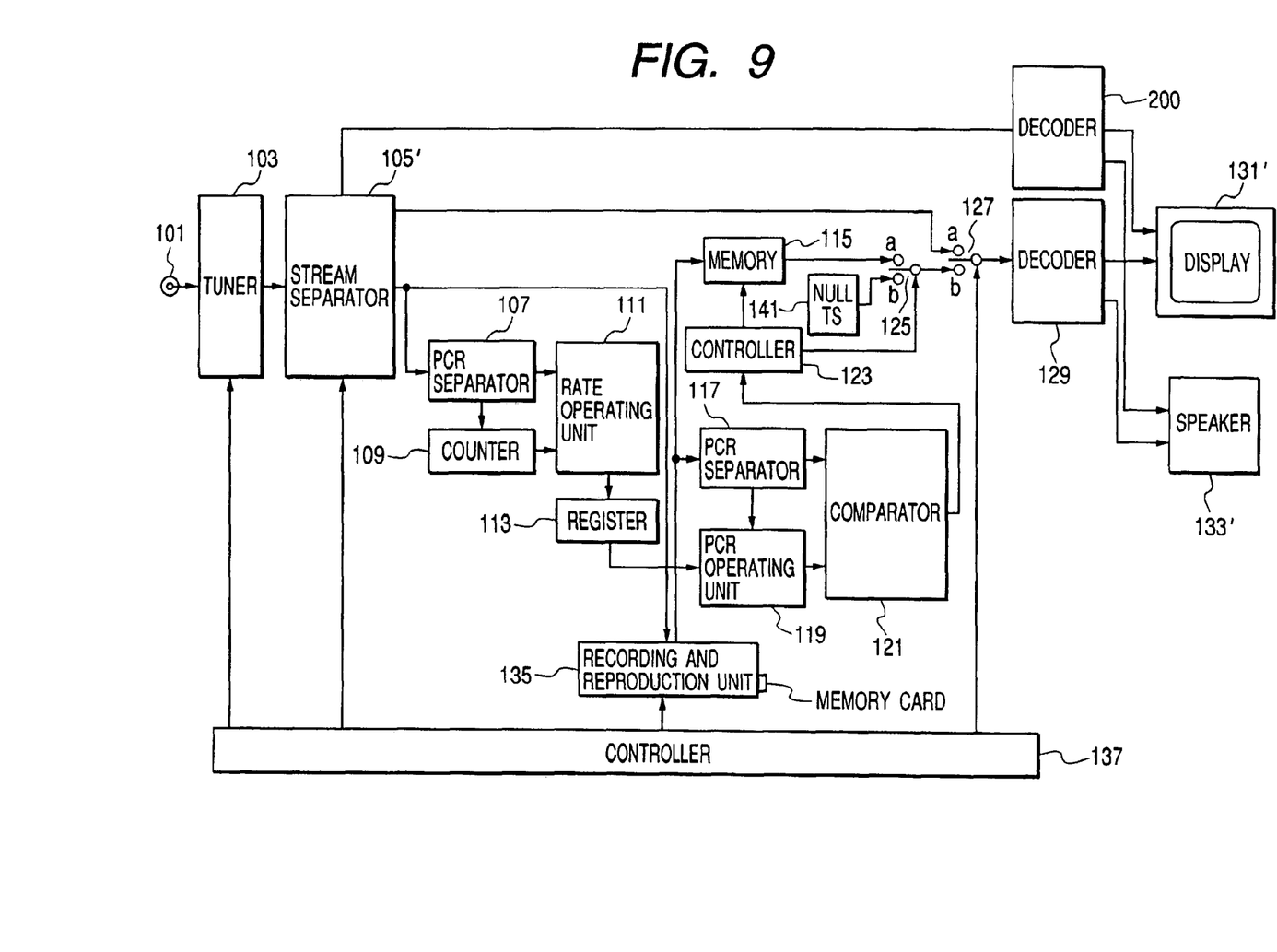
FIG. 9 is a block diagram showing the configuration of an information processing apparatus constituting a fourth embodiment of the present invention.

FIG. 9 is a block diagram showing the configuration of an information processing apparatus constituting a fourth embodiment of the present invention, wherein components equivalent in function to those in FIG. 7 are given corresponding numbers and will not be explained further.

In FIG. 9, there is provided a decoder 200 for decoding the video signal and the audio signal similarly to the decoder 129.

Based on a control signal outputted from the controller 137, a stream separator 105' sends, to the decoder 200, not only the output of the stream separator 105 in the third embodiment but also the transport stream signal of another desired program. A display unit 131' can display the image signals from the decoders 129, 200 either selectively or simultaneously (multi-window display). A speaker 133' can selectively output the desired audio signal from the decoders 129, 200.

Thus the fourth embodiment enables simultaneous display of simultaneously desired two programs, from the TS in which plural programs are multiplexed. Such simultaneous display is not limited to two programs as explained in the foregoing, but there can naturally be displayed plural programs if the decoder 200 is provided in plural units and if the stream separator 105' can output the desired transport streams according to the number of the provided decoders.

In other words, the foregoing description of embodiments have been given for illustrative purposes only and not be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An information processing apparatus comprising:
    a) selection means for selecting desired packets from input stream data in which plural packets are multiplexed on time-division basis;
    b) rewriting means for rewriting, into a common identification information, an identification information of a packet other than the desired packets in the input stream data;
    c) counter means for counting the number of packets, other than said desired packets, in said input stream data; and
    d) recording means for recording, on a recording medium, data of said desired packets and information data indicating the number of said counted packets.

2. An apparatus according to claim 1, wherein said input stream data is a transport stream based on MPEG2 system.

3. An apparatus according to claim 1, wherein said input stream data contains plural programs multiplexed on time-division basis.

4. An apparatus according to claim 1, further comprising:
    reproduction means for reproducing the data of the desired packets recorded by said recording means; and
    generation means for inserting, among said desired packets, null packets of a number same as that of the packets indicated by said information data reproduced by said reproduction means, thereby generating a new stream data.

5. An apparatus according to claim 4, further comprising decoding means for decoding said new stream data generated by said generation means.

6. An apparatus according to claim 5, further comprising monitor means for outputting data decoded by said decoding means.

7. An apparatus according to claim 1, wherein said recording medium is a hard disk.

8. An apparatus according to claim 1, wherein said recording medium is a memory.

9. An information processing method comprising the steps of:
    a) selecting desired packets from input stream data in which plural packets are multiplexed on time-division basis;
    b) rewriting, into a common identification information, an identification information of a packet other than the desired packets in the input stream data;
    c) counting the number of packets, other than said desired packets, in said input stream data; and
    d) recording, on a recording medium, data of said desired packets and information data indicating the number of said counted packets.

10. An information processing apparatus comprising:
    a) a control circuit for controlling of rewriting, into a common identification information, an identification information of a packet other than desired packets in an input data stream in which plural packets are multiplexed on time-division basis; and
    b) recording control circuit for recording, on a recording medium, data of the desired packets and information data indicating the number of packets of which identification information is rewritten into the common identification information.

* * * * *